United States Patent
Colotte et al.

(10) Patent No.: US 8,690,520 B2
(45) Date of Patent: Apr. 8, 2014

(54) SYSTEM FOR CONTROLLING VARIABLE GEOMETRY EQUIPMENT OF A GAS TURBINE ENGINE ESPECIALLY COMPRISING A GUIDING TRACK CONNECTION

(75) Inventors: Baptiste Benoit Colotte, Melun (FR); Bruno Robert Gaully, Marolles en Hurepoix (FR)

(73) Assignee: Snecma, Paris (FR)

( * ) Notice: Subject to any disclaimer, the term of this patent is extended or adjusted under 35 U.S.C. 154(b) by 503 days.

(21) Appl. No.: 13/121,706

(22) PCT Filed: Sep. 29, 2009

(86) PCT No.: PCT/EP2009/062625
§ 371 (c)(1),
(2), (4) Date: Mar. 30, 2011

(87) PCT Pub. No.: WO2010/037751
PCT Pub. Date: Apr. 8, 2010

(65) Prior Publication Data
US 2011/0190950 A1    Aug. 4, 2011

(30) Foreign Application Priority Data
Sep. 30, 2008   (FR) ...................................... 08 56569

(51) Int. Cl.
*F04D 29/56* (2006.01)

(52) U.S. Cl.
USPC .......... 415/36; 415/149.4; 415/165; 415/191; 415/211.2; 416/47; 416/104; 416/167

(58) Field of Classification Search
USPC .............. 415/36, 40, 42, 149.1, 149.2, 149.4, 415/150, 153.2, 165, 191, 211.2; 416/44–47, 103–107, 112–116, 154, 416/167
See application file for complete search history.

(56) References Cited

U.S. PATENT DOCUMENTS

| | | | |
|---|---|---|---|
| 4,292,802 A | 10/1981 | Snow | |
| 4,992,946 A | 2/1991 | Butz et al. | |

(Continued)

FOREIGN PATENT DOCUMENTS

| | | |
|---|---|---|
| DE | 1 224 563 | 9/1966 |
| EP | 1 398 464 | 3/2004 |
| EP | 1 724 471 | 11/2006 |
| FR | 2 445 439 | 7/1980 |
| FR | 2 633 046 | 12/1989 |
| WO | 2007 116319 | 10/2007 |

OTHER PUBLICATIONS

U.S. Appl. No. 13/379,869, filed Dec. 21, 2011, Gaully, et al.

(Continued)

*Primary Examiner* — Igor Kershteyn
(74) *Attorney, Agent, or Firm* — Oblon, Spivak, McClelland, Maier & Neustadt, L.L.P.

(57) ABSTRACT

A system for controlling at least two sets of variable geometry equipment of a gas turbine engine including at least one first body and a second body, the first set of equipment being a stage of variable stator vanes of a compressor of the first body moving between a closed position during idling and an open position at high speed, and the second set of equipment being at least one bleed valve of a compressor of the second body moving between an open position during idling and a closed position at high speed. An actuator actuates the two sets of equipment.

12 Claims, 2 Drawing Sheets

(56) References Cited

U.S. PATENT DOCUMENTS

| | | | |
|---|---|---|---|
| 6,471,469 B2 * | 10/2002 | Toffan et al. | 415/160 |
| 6,742,324 B2 * | 6/2004 | Bachelder et al. | 415/145 |
| 2004/0050071 A1 | 3/2004 | Bachelder et al. | |
| 2006/0260307 A1 | 11/2006 | Bouru | |
| 2008/0028764 A1 | 2/2008 | Cadieux | |
| 2010/0080684 A1 | 4/2010 | Colotte et al. | |
| 2010/0158662 A1 | 6/2010 | Colotte et al. | |
| 2010/0158663 A1 | 6/2010 | Colotte et al. | |

OTHER PUBLICATIONS

U.S. Appl. No. 13/121,726, filed Mar. 30, 2011, Colotte, et al.
U.S. Appl. No. 13/121,752, filed Mar. 30, 2011, Colotte, et al.
International Search Report issued Nov. 4, 2009 in PCT/EP09/62625 filed Sep. 29, 2009.

* cited by examiner

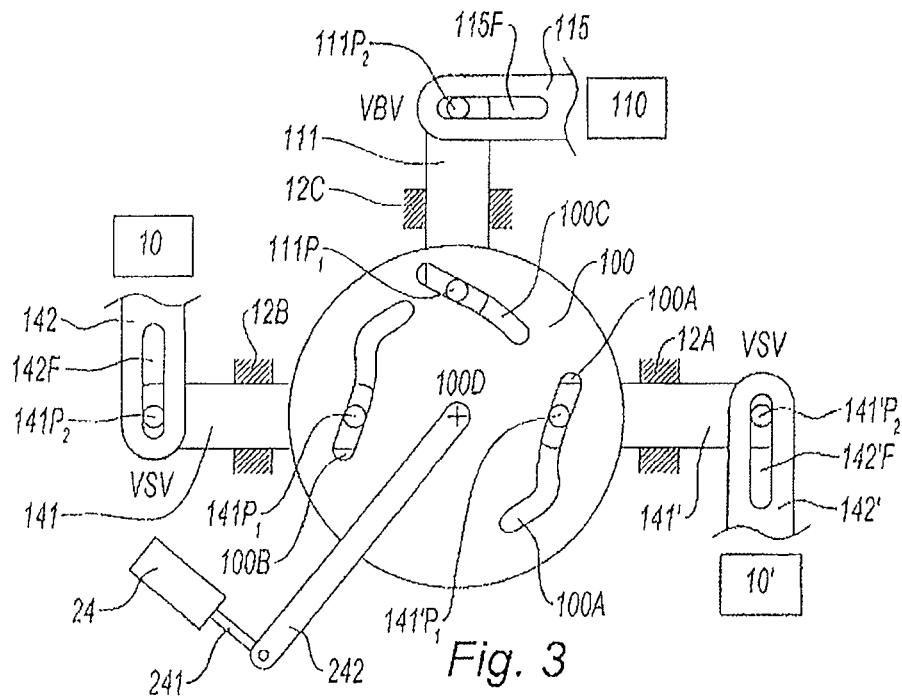
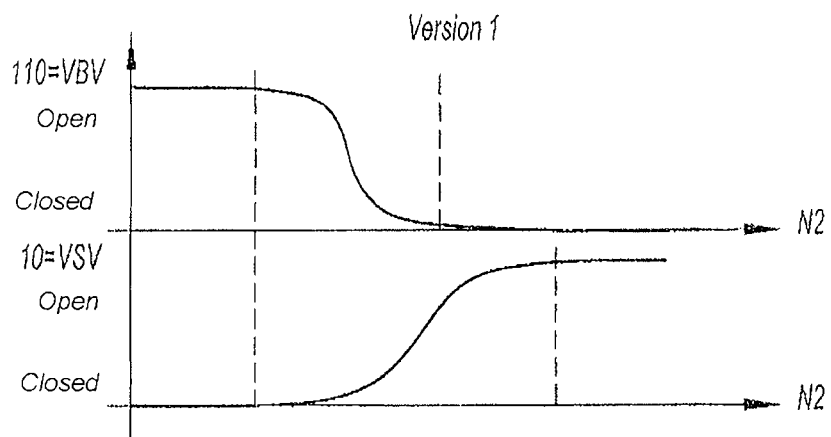
Fig. 4
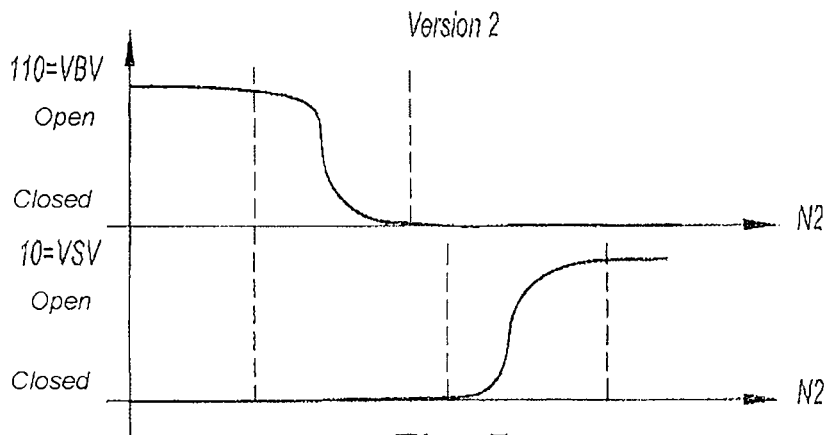
Fig. 5

SYSTEM FOR CONTROLLING VARIABLE GEOMETRY EQUIPMENT OF A GAS TURBINE ENGINE ESPECIALLY COMPRISING A GUIDING TRACK CONNECTION

The present invention relates to the general field of the control of variable geometry equipment items of a gas turbine engine, notably a jet engine. The invention relates more particularly to the optimization of the control of several equipment items forming part of separate bodies of the gas turbine engine.

The expression "variable geometry equipment item" should be understood here to mean an equipment item linked to a control member and the dimension, the shape, the position and/or the speed of which is or are able to be modified on the basis of detected events or defined parameters, in order to act on the operation of the engine. Examples of variable geometry equipment items include air discharge valves of the compressor (with variable opening), fixed compressor vanes with variable setting angle, turbine vanes whose clearance at the tip is variable, variable flow rate fuel pumps, etc.

The term "body" conventionally designates a subset of the gas turbine engine, comprising as main members a compressor and a turbine assembled on one and the same axis. It may be multibody. A dual-body engine comprises a so-called high-pressure body and a so-called low-pressure body. Each body includes a compressor and a turbine, the vanes of which are driven in rotation about the axis of the shaft on which they are mounted.

In general, the various bodies of a gas turbine engine are designed to operate independently of one another. Their rotation speeds are independent, even if they are linked or correlated at certain operating speeds.

To control variable geometry equipment items forming part of different bodies, distinct control systems are provided for these distinct equipment items: two control circuits, two actuators, two power sources, etc. It follows that the weight, the cost and the bulk of such an equipment control system are relatively high. Such a configuration is the one retained in the applicant's European Patent Application, published under the number EP 1 724 474.

For example, the compressor of the low-pressure body may include one or more air discharge valves (often designated VBV, standing for "Variable Bleed Valve"), whereas the compressor of the high-pressure body may include one or more variable-angle stator vane stages (often designated VSV, which stands for "Variable Stator Vanes"). To reduce the weight of these equipment items and their control members, it is possible to envisage not installing any VBVs. While the saving achieved in this way is substantial (the actuators, the servo valves, the ducting, the harnesses and so on that are associated with them are eliminated), the drawbacks are significant, notably at idling speed if water or hail penetrates into the engine, leading to an increased risk of extinction thereof.

The patent application FR 2 445 439 from General Electric Company describes a single means for controlling air discharge valves of a low-pressure stage and variable-angle stator stages of a high-pressure stage, but this means controls both equipment items essentially sequentially, only the stator vanes being actuated in normal operation of the turbine engine (that is to say, above idling speed).

The invention aims to propose a gas turbine engine with variable geometry equipment items belonging to different bodies of the engine and a control system for these equipment items that is optimized.

Thus, the invention relates to a system for controlling at least two variable geometry equipment items of a gas turbine engine, the engine comprising at least one first body rotating at a first speed and a second body rotating at a second speed, the first equipment item being a variable-angle stator vane stage of a compressor of the first body moving between a closed position when idling and an open position at high speed, the second equipment item being at least one discharge valve of a compressor of the second body moving between an open position when idling and a closed position at high speed, characterized in that it includes an actuator which actuates both equipment items.

By using a single actuator to control several (at least two) variable geometry equipment items, the control system makes it possible to reduce the number of parts of the engine and thus achieve the objective of the invention. The weight, the volume and the cost of a second control system are, at least largely, avoided, since the equipment items of the first and second bodies are actuated by the same actuator.

According to one embodiment, the control system is able to control more than two variable geometry equipment items using a single actuator.

According to one embodiment, the actuator is controlled by the speed of rotation of the first body.

Thus, the equipment item of the second body is controlled by the speed of rotation of the first body, via the actuator.

According to a particular embodiment, the first body is a high-pressure body and the second body is a low-pressure body.

In particular, the gas turbine engine comprising a low-pressure compressor and a high-pressure compressor, the variable geometry equipment item of the low-pressure compressor is controlled by the speed of rotation of the high-pressure compressor.

According to one embodiment, in the case of a gas turbine engine with a high-pressure body and a low-pressure body, the variable geometry equipment items of the high-pressure body are located close to the low-pressure body (for example, close to the upstream side of the high-pressure body).

According to a particular embodiment in this case, the gas turbine engine is dual-body, with a high-pressure body and a low-pressure body. Preferably in this case, the variable-angle stator vane stage(s) form(s) part of the high-pressure body, the first equipment item controlled by the control system forming part of the low-pressure body.

According to a particular embodiment in this case, the vane stage comprises a plurality of vanes, each mounted to pivot on a casing of the engine, and a control ring surrounding the casing is linked to each of the vanes of the stage via levers, the actuator being able to drive the control ring of the stage in rotation via a driving member mounted on the casing.

According to one embodiment, a variable geometry equipment item is an air discharge valve of the engine. This equipment item may comprise one valve or a plurality of air discharge valves. It is, for example, an air discharge valve of the VBV type downstream of the low-pressure compressor.

In this particular case, the invention presents the following advantages:

Only a single set of actuators is needed instead of two, as well as associated service means, namely ducting, servo valves, outlets on the HMU or electric motor, etc.

A degree of freedom concerning booster performance is retained without adding complete variable geometry.

There is a saving in maintenance capacity: in practice, the elimination of the VBV actuation eliminates the risk of failures on this variable geometry.

The capacity to evacuate water or hail at low speed is retained. There follows a better robustness to extinction of the chamber when idling compared to a booster architecture without VBV.

The electric system is simplified. A local servo control loop is eliminated: computer output, harness, position return sensor (TEC), reduced computer dimensioning, etc.).

The control system of the invention may also be adapted for the control of various types of equipment items. In addition to those discussed hereinabove, the variable geometry equipment items may notably include or form an element of one or more of the following devices:

- an air discharge valve of the high-pressure compressor with proportional opening (often called "Transient Bleed Valve" (TBV) or "Start Bleed Valve" (SBV));
- an on or off air discharge valve of the high-pressure compressor (often designated "Handling Bleed Valve" (HBV));
- an air flow rate regulation valve contributing to the control of clearance in a low-pressure turbine (often designated "Low Pressure Turbine Active Clearance Control" (LP-TACC)), or in a high-pressure turbine (often designated "High Pressure Turbine Active Clearance Control" (HP-TACC)).

According to one embodiment, in the control system, the actuator includes a mobile control member, the displacements of which transmit the control to the variable geometry equipment items. The control member may, for example, include the arm of a cylinder.

According to one embodiment, the actuator is arranged to actuate the first variable geometry equipment item by varying a parameter within an actuation band of the first equipment item, the actuator being arranged to actuate the second variable geometry equipment item by varying the same parameter within an actuation band of the second equipment item.

The parameter of the actuator indicated above may, for example, be the position of the actuation member of the actuator. Thus, this parameter may be the position of the end of the arm of a cylinder. Thus, in this case, varying this parameter means displacing the end of the arm of the cylinder or the position of the working end of the actuator.

According to a preferred embodiment, the control system comprising a disk that rotates about an axis linked to said equipment items by mechanical transmission means comprising a pin that travels along a guiding track, the profile of the tracks defining the actuation laws of the two equipment items when the disk is driven in rotation about its axis by the actuator.

More particularly, the mechanical transmission means comprise rods for actuating said equipment items, the guiding tracks being formed on the rotating disk and the pins being firmly attached to the rods for actuating said equipment items. The rods for actuating said equipment items are, in accordance with another characteristic, mobile in translation.

In the case of a combined VSV and VBV control, the rotating disk is mounted on the casing of the compressor of the first body.

The actuator may be an electric motor, a hydraulic motor or a pneumatic motor.

When the actuation parameter varies within a range located outside the actuation band of an equipment item, the latter is not actuated by the actuator. Such a range of values of the parameter of the actuator, in which no action is actually applied to the equipment item concerned, constitutes for said equipment item a "dead travel". Within such a band, regardless of the variations of the parameter, the actuator does not act (or does not act significantly) on the equipment item concerned.

According to a particular embodiment, at least a part of the actuation band of the first equipment item is outside of the actuation band of the second equipment item.

The control of two variable geometry equipment items by a single actuator may be facilitated by the fact that the actuation bands of the two equipment items do not totally correspond, enabling only a single equipment item to be actuated outside of the common region.

According to another particular embodiment, the actuation bands of the first and second equipment items are separate, that is to say that the actuation band of the first equipment item is entirely outside of the actuation band of the second equipment item (the plates do not intersect).

Thus, the equipment items may be actuated sequentially. In practice, when the parameter of the actuator is varied within the actuation band of the first equipment item, these variations induce almost no movement, have no effect on the second equipment item, and vice versa.

According to a particular embodiment, the actuation band of one of the first and second equipment items is entirely contained within the actuation band of the other equipment item.

In this case, the equipment items are actuated simultaneously within their common region, which may present advantages depending on the nature of the equipment items. Such an embodiment may make it possible to provide a greater actuation amplitude.

According to a particular embodiment in this case, the actuation band of one of the equipment items has an amplitude very much less than the overall amplitude of the actuation band of the other equipment item; for example, it may represent less than 20% or less than 10% of this band. This way, when the band of the equipment item with the reduced actuation band is included within the band of the other equipment item, the equipment item control actions lead to only a low and/or insensitive variation of the control of the other equipment item. This arrangement facilitates the control, with a single control system, of two equipment items.

The control system is preferably arranged for the variations of the parameter of the actuator between the limits of its actuation band to be sufficient to actuate the equipment items with sufficient amplitude.

According to one embodiment, the link between the actuator and one of the equipment items comprises a declutching device, able to declutch the driving of this equipment item by the actuator over a band of values of the actuation parameter. This band of values is therefore located outside of the actuation band of the equipment item concerned. Thus, the declutching device makes it possible to reserve a range of the actuation band for the sole control of the other equipment item or items. This may be essential when the equipment item concerned must not be affected even when the control of one of the other controlled equipment items varies.

According to one embodiment, the control system also comprises return means maintaining a control member of one of the equipment items in a predetermined position, at least when the parameter of the actuator varies within a range located outside the actuation band of the equipment item.

The invention also relates to a gas turbine engine equipped with the control system described hereinabove.

The invention will be better understood from the following description of the preferred embodiment of the engine and of the system of the invention, with reference to the appended drawing plates, in which:

FIG. 3 is a plan diagrammatic view of a device for controlling the position of the two equipment items;

FIGS. 4 and 5 are curves giving the position of the stator vanes and of the discharge valves according to the speed of the engine, in the case of an overlap and in the case of an absence of overlap of the opening and closure bands of the two equipment items.

Figure 1:
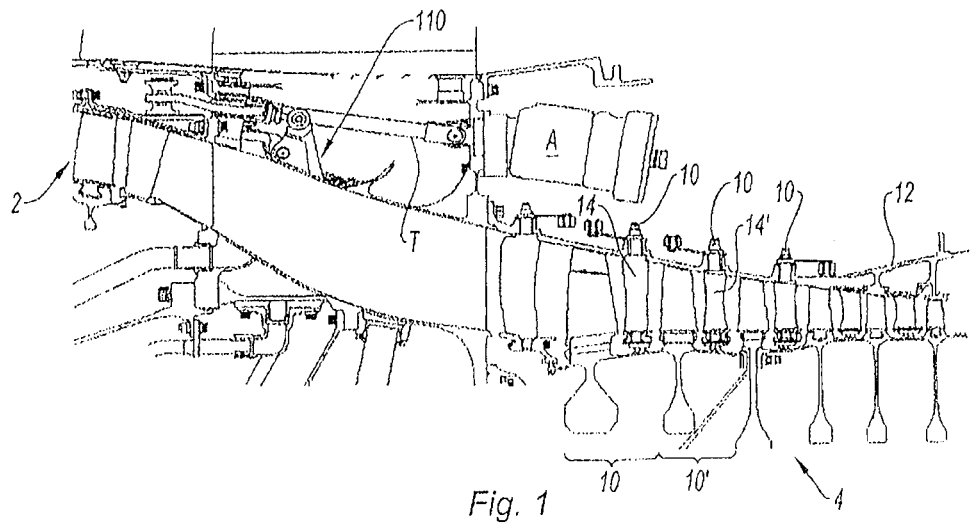
FIG. 1 represents an axial cross section of a part of a jet engine of the prior art comprising a discharge valve VBV and variable stator fins.
Figure 2:
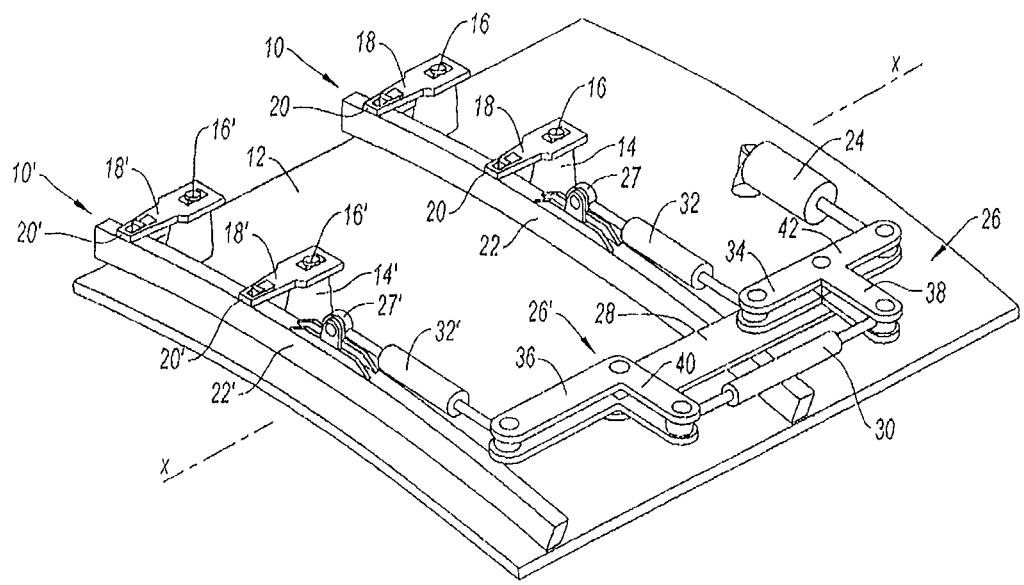
FIG. 2 represents a perspective view of a VSV control system according to the prior art.

As is known, as represented in FIGS. 1 and 2, a gas turbine engine applicable to the aeronautical domain such as a jet engine, in this case of axis X-X, comprises, from upstream to downstream, a fan, a low-pressure compressor 2, a high-pressure compressor 4, a combustion chamber, a high-pressure turbine, a low-pressure turbine and a nozzle for ejecting gases (not represented). The high-pressure compressor and the high-pressure turbine are firmly attached to one and the same shaft, called the high-pressure shaft, and thus belong to the high-pressure body of the engine or first body revolving at a first speed, whereas the low-pressure compressor and the low-pressure turbine are firmly attached to one and the same shaft, called the low-pressure shaft, and thus belong to the low-pressure body of the engine or second body revolving at a second speed.

Hereinbelow, the abbreviations LP and HP will be used respectively for low pressure and for high pressure.

The HP compressor 4 comprises at least one stage formed by a wheel of mobile vanes and a wheel of fixed vanes (also called stator vanes). Each stage is formed by a plurality of vanes positioned radially around the axis X-X of the gas turbine engine. In the case in point, the HP compressor comprises a plurality of stages 10, 10' etc., with alternating mobile vane wheels and fixed vane wheels. The vanes are enclosed by a cylindrical casing 12 which is centered on the axis X-X of the engine.

Among the fixed vane wheels, at least one stage 10 includes so-called variable-angle vanes 14. Each vane is mounted to pivot about an axis 16 (or pivot) which passes through the casing 12. The angular position of each vane 14 can be adjusted by driving its pivot 16 in rotation.

The variable vane stage 10 forms a first variable geometry equipment item, belonging to the HP body (since it belongs to the HP compressor). The variable parameter of this equipment item is the angle of the vanes 14; in the case in point, all the vanes 14 are driven simultaneously in rotation, by virtue of a control ring 22 of the stage 10 of vanes 14.

The control ring 22 is of overall circular shape; it surrounds the casing 12 and is centered on the axis X-X of the engine. The synchronized modification of the angular position of the vanes 14 is thus obtained by a rotation of the control ring 22 about the axis X-X of the engine, in a known manner.

FIG. 2 shows a synchronized control mechanism for two stator vane stages 10 and 10' of the prior art.

The control system is arranged to control the rotation of the control rings 22 and 22' of the variable-angle vane stages 10 and 10'.

The control system includes an actuator 24, in this case a cylinder, which is mechanically linked to the stage 10 to drive the stator vanes in rotation.

To this end, each pivot 16, 16' of the variable vanes 14, 14' is linked to one end of a control connecting rod 18, 18', the other end of which is articulated about a trunnion 20, 20' fixed to the control ring 22, 22' and extending radially relative to it.

The ring comprises at least one end fitting 27, 27' to which is fixed one end of a control rod 32, 32' of the stretching screw type, extending roughly tangentially to the ring 22, 22'. The other end of the control rod is firmly attached to a return member 26, 26', mounted so as to pivot on a module 28 of the casing 12 of the compressor. The driving return member 26 is T-shaped. The control rod 32 is fixed to one end of a first branch 34 of the driving return member 26, the end of the rod of the cylinder 24 being fixed, in an articulated manner, to the end of a second branch 42 which is located roughly in the extension of the first branch 34.

The following return member 26' is L-shaped with a branch 36 linked to the rod 32' and a branch 40 linked via a synchronization bar to the third branch 38 of the T. The actuator (cylinder) 24 may drive the control ring 22 of the variable-angle vane stage 10 in rotation via the driving return member 26, which transmits the movement of the cylinder 24 to the control rod 32 which in turn transmits the movement to the ring 22 to which it is securely attached in translation (curvilinear).

The actuator drives the control ring 22' in rotation via the synchronization bar 30.

The cylinder 24 is controlled by an electronic control unit. Its movements depend on the speed N2 of rotation of the HP compressor.

The engine, as can be seen in FIG. 1, comprises a second variable geometry equipment item 110. In the case in point, it is an air discharge valve, of the VBV type. The variable parameter of this equipment item 110 is the opening angle of the discharge valve 110. This equipment item 110 is positioned downstream of the LP compressor. The function of the VBV valve 110 is to discharge air at the outlet of the LP compressor 2 according to defined operating conditions. The second equipment item 110 generally includes a plurality of such valves.

According to the prior art, the equipment item 110 is controlled by a system specific to it. FIG. 1 shows an actuator A which acts via a linkage system T on the VBV valve.

According to the invention, a system is provided that jointly controls the two equipment items. Thus, the actuator 24 which controls the VSV vanes also controls the displacement of a control member 115 for the second equipment item 110, using a specific device.

Referring to FIG. 3 which diagrammatically shows a control system according to one embodiment, the actuator 24 can be seen, which acts both on a first equipment item consisting of a pair 10 and 10' of VSV variable-angle vane stages and on a second equipment item 110 consisting of a valve or a plurality of discharge valves VBV.

The control rings of the vanes 10 and 10' are set to rotate about the axis XX of the engine, each by a pivoting lever, respectively 142 and 142'. The link between the control rings 22 and 22' and the levers 142 and 142' are not represented.

The discharge valve 110 is set to move by a pivoting lever 115.

The three levers 142, 142' and 115 are each controlled by a rod, namely 141 and 141' for the levers 142 and 142' and 111 for the lever 115.

The rods are mobile in translation within guides firmly attached to the casing 12. The rod 111 is mobile along its axis in the guide 12C. Similarly, the rods 141 and 141' are mobile axially in their respective guides 12A and 12B. The translational movement of the rods is transmitted to the levers via links in which a pin, 141P2, 141'P2 and 111P2, firmly attached to the rods, slides freely in the slot 142F, 142'F and 115F of the lever that it controls. The slot makes it possible to absorb the length variation of the lever arm when the levers pivot about their center of rotation.

At their other end, the rods 141, 141' and 111 each comprise another pin that is transversal relative to their axis, 141P1, 141'P1 and 111P1, which can slide in a guiding track 100A, 100B and 100C formed in a disk 100. The disk 100 is mounted to rotate about an axis 100D firmly attached to the casing 12. The axis 100D is perpendicular to the plane formed by the three rods.

Thus, the rotating disk 100 is linked to said equipment items 10, 10', 110 by mechanical transmission means comprising the pins 111P1, 141P1, 141'P1 travelling along a guiding track 100A, 100B, 100C. The profiles of the guiding tracks define the actuation laws of the equipment items when the disk 100 is driven in rotation about its axis 100D by the actuator 24.

The link between the pins and their respective track is optimized in order to reduce the mechanical losses. The pins may be in linear bearing form so that the pin rolls in the track without friction. To form a track, the slots formed in the disk are of the width of the pins.

Preferably, the control arms of the two stator vane stages 10 and 10' are in the extension of one another in order to reduce the forces on the rotation axis 100D of the disk 100. The frictions on the axis 100A and the power needed to actuate the rods are thus reduced. The device is not limited to the control of two arms for the variable-angle stator vane stages. The device can easily be adapted for a higher number.

The disk 100 is driven in rotation about its axis 100D by an actuator 24. In this case, the actuator is linked to the disk by a rod 241 and an arm 242 linked to the center of the latter. The displacement of the rod along its axis by the actuator drives the rotation of the disk via the arm 242. Depending on whether the rod 241 of the actuator 24 is extended or retracted, the disk rotates in the clockwise direction or in the reverse direction.

Thus, when the disk 100 rotates about its axis, the rotation movement of the disk is transformed into translational movement of the rods according to the position of the pins within their respective track. Each angular position of the disk has a corresponding precise position of the pins within their respective track. The position of the pins determines the angular position of the levers to which the rods are attached.

The angular position of each of the levers is determined, when the disk rotates about its axis 100D, by the shape of the tracks formed in the disk.

In other words, the pivoting law of the levers when the disk rotates about its axis is determined by the trajectory of the pins on the disk. This trajectory is given by the profile of the tracks.

The inventive solution therefore makes it possible to define the opening or closure position of the stator vanes and of the discharge valves for each angular position of the disk.

Referring to FIGS. 4 and 5, the relative opening laws of the variable-angle vanes (referenced VSV) and of the discharge valves (referenced VBV) according to the rotation speed N2 of the HP body can be seen. At zero speed N2 the discharge valves are open and the variable-angle vanes are in the so-called closed position. When the speed increases, the discharge valves close gradually whereas the vanes open. In the version V1 represented in FIG. 4, when the speed increases, the opening of the variable-angle vanes VSV begins at the same time as the closure of the discharge valves VBV but ends after, whereas in the version V2, represented by FIG. 5, it begins only after their closure. The choice of a version, and the exact moment at which the closure of the discharge valves begins, are defined by modifying the shape of the tracks.

Although the invention has been described in relation to a particular embodiment, it is obvious that it is in no way limited thereto and that it includes all the technical equivalents of the means described and their combinations provided that they fall within the context of the invention.

The invention claimed is:

1. A system for controlling at least two variable geometry equipment items of a gas turbine engine, the engine including at least one first body rotating at a first speed and a second body rotating at a second speed, the first equipment item being a variable-angle stator vane stage of a compressor of the first body moving between a closed position when idling and an open position at high speed, the second equipment item being at least one discharge valve of a compressor of the second body moving between an open position when idling and a closed position at high speed, the system comprising:
an actuator that actuates both equipment items, and that comprises a disk that rotates about an axis linked to the equipment items by a mechanical transmission means comprising a pin that travels along a guiding track, a profile of the track defining actuation laws of the two equipment items when the disk is driven in rotation about its axis by the actuator.

2. The control system as claimed in claim 1, in which the first body is a high-pressure body and the second body is a low-pressure body.

3. The control system as claimed in claim 1, in which the actuator is controlled according to a speed of rotation of one of the bodies of the engine.

4. The control system as claimed in claim 2, in which the actuator is controlled by the speed of rotation of the high-pressure body.

5. The control system as claimed in claim 1, in which the mechanical transmission means comprises rods for actuating the equipment items, the guiding track being formed on the rotating disk and the pins being firmly attached to the rods for actuating the equipment items.

6. The system as claimed in claim 5, in which the rods for actuating the equipment items are mobile in translation.

7. The control system as claimed in claim 1, in which the rotating disk is mounted on the casing of the compressor of the first body.

8. The system as claimed in claim 1, in which the actuator is an electric motor.

9. The system as claimed in claim 1, in which the actuator is a hydraulic or pneumatic motor.

10. The control system as claimed in claim 1, in which the actuation laws for the equipment items each comprise an actuation band, the actuation band of one of the equipment items being included within the actuation band of the other equipment item.

11. The control system as claimed in claim 1, in which the actuation laws for the equipment items each comprise an actuation band, the actuation band of the second equipment item being entirely outside of the operating band of the first equipment item.

12. A gas turbine engine comprising a control system as claimed in claim 1.

* * * * *